(12) United States Patent
Stauder et al.

(10) Patent No.: US 11,511,721 B2
(45) Date of Patent: Nov. 29, 2022

(54) ELECTRIC HOLLOW SHAFT MOTOR

(71) Applicant: Continental Teves AG & Co. oHG, Frankfurt am Main (DE)

(72) Inventors: Peter Stauder, Frankfurt am Main (DE); Nam Anh Dinh, Frankfurt am Main (DE); Tom Kaufmann, Frankfurt am Main (DE); Thomas Knopik, Frankfurt am Main (DE); Jens Habig, Frankfurt am Main (DE)

(73) Assignee: Continental Teves AG & Co. oHG

( * ) Notice: Subject to any disclaimer, the term of this patent is extended or adjusted under 35 U.S.C. 154(b) by 209 days.

(21) Appl. No.: 16/648,059

(22) PCT Filed: Sep. 14, 2018

(86) PCT No.: PCT/EP2018/074864
§ 371 (c)(1),
(2) Date: Mar. 17, 2020

(87) PCT Pub. No.: WO2019/057623
PCT Pub. Date: Mar. 28, 2019

(65) Prior Publication Data
US 2020/0269825 A1 Aug. 27, 2020

(30) Foreign Application Priority Data

Sep. 20, 2017 (DE) .................... 10 2017 216 664.9

(51) Int. Cl.
*B60T 13/74* (2006.01)
*H02K 11/215* (2016.01)
(Continued)

(52) U.S. Cl.
CPC ............ *B60T 13/745* (2013.01); *F16D 65/28* (2013.01); *H02K 7/06* (2013.01); *H02K 11/215* (2016.01)

(58) Field of Classification Search
CPC ...... B60T 13/745; B60T 13/741; B60T 13/74; B60T 8/4018; B60T 8/4022;
(Continued)

(56) References Cited

U.S. PATENT DOCUMENTS 5,788,341 A * 8/1998 Penrod ...................... B60T 8/00
188/156
6,230,492 B1 * 5/2001 Kingston .............. B60T 13/745
60/545

(Continued)

FOREIGN PATENT DOCUMENTS

CN 101689789 A 3/2010
CN 103326515 A 9/2013
(Continued)

OTHER PUBLICATIONS

Chinese Office Action for Chinese Application No. 201880060761.2, dated Aug. 17, 2021, with translation, 14 pages.
(Continued)

*Primary Examiner* — Bradley T King
*Assistant Examiner* — Stephen M Bowes
(74) *Attorney, Agent, or Firm* — RatnerPrestia

(57) ABSTRACT

An electric hollow-shaft motor having a hollow shaft which is able to be driven in rotation, and a detection device which is configured to detect the rotational position of the hollow shaft, wherein the detection device includes a magnet which is arranged on the hollow shaft, and a fixed magnetic field sensor which is arranged within the hollow shaft, wherein the magnetic field sensor is configured to detect a magnetic field generated by the magnet.

11 Claims, 1 Drawing Sheet

(51) Int. Cl.
*F16D 65/28* (2006.01)
*H02K 7/06* (2006.01)

(58) Field of Classification Search
CPC ........... H02K 11/215; F16H 2025/2075; F16H 2025/204; F16H 25/2015
See application file for complete search history.

(56) References Cited

U.S. PATENT DOCUMENTS

| | | | |
|---|---|---|---|
| 7,973,529 B2 * | 7/2011 | Kikuchi | H02K 11/215 |
| | | | 324/207.25 |
| 8,159,096 B2 | 4/2012 | Tezuka et al. | |
| 8,749,229 B2 | 6/2014 | Naganuma et al. | |
| 2010/0176695 A1 | 7/2010 | Tezuka et al. | |
| 2012/0160043 A1 * | 6/2012 | Drumm | F16H 25/20 |
| | | | 74/89.23 |
| 2016/0272181 A1 * | 9/2016 | Lee | B60T 13/166 |
| 2018/0009425 A1 * | 1/2018 | Feigel | B60T 8/00 |
| | | | 188/156 |
| 2020/0119623 A1 * | 4/2020 | Kuhn | H02K 11/215 |
| | | | 324/207.25 |

FOREIGN PATENT DOCUMENTS

| | | |
|---|---|---|
| DE | 112007003557 T5 | 4/2010 |
| JP | 2012145425 A | 8/2012 |
| JP | 2015065768 A | 4/2015 |
| JP | 6147398 B1 | 6/2017 |
| WO | 2009146737 A1 | 12/2009 |

OTHER PUBLICATIONS

European Intent to Grant a Patent for European Application No. 18 769 695.0, dated Sep. 7, 2021, with translation, 28 pages.
International Search Report and Written Opinion for International Application No. PCT/EP2018/074864, dated Oct. 19, 2018, 8 pages.
German Search Report for German Application No. 10 2017 216 664.9, dated Apr. 27, 2021, with partial English translation, 9 pages.
Chinese Office Action for Chinese Application No. 201880060761. 2, dated Dec. 31, 2021, with translation, 11 pages.

* cited by examiner

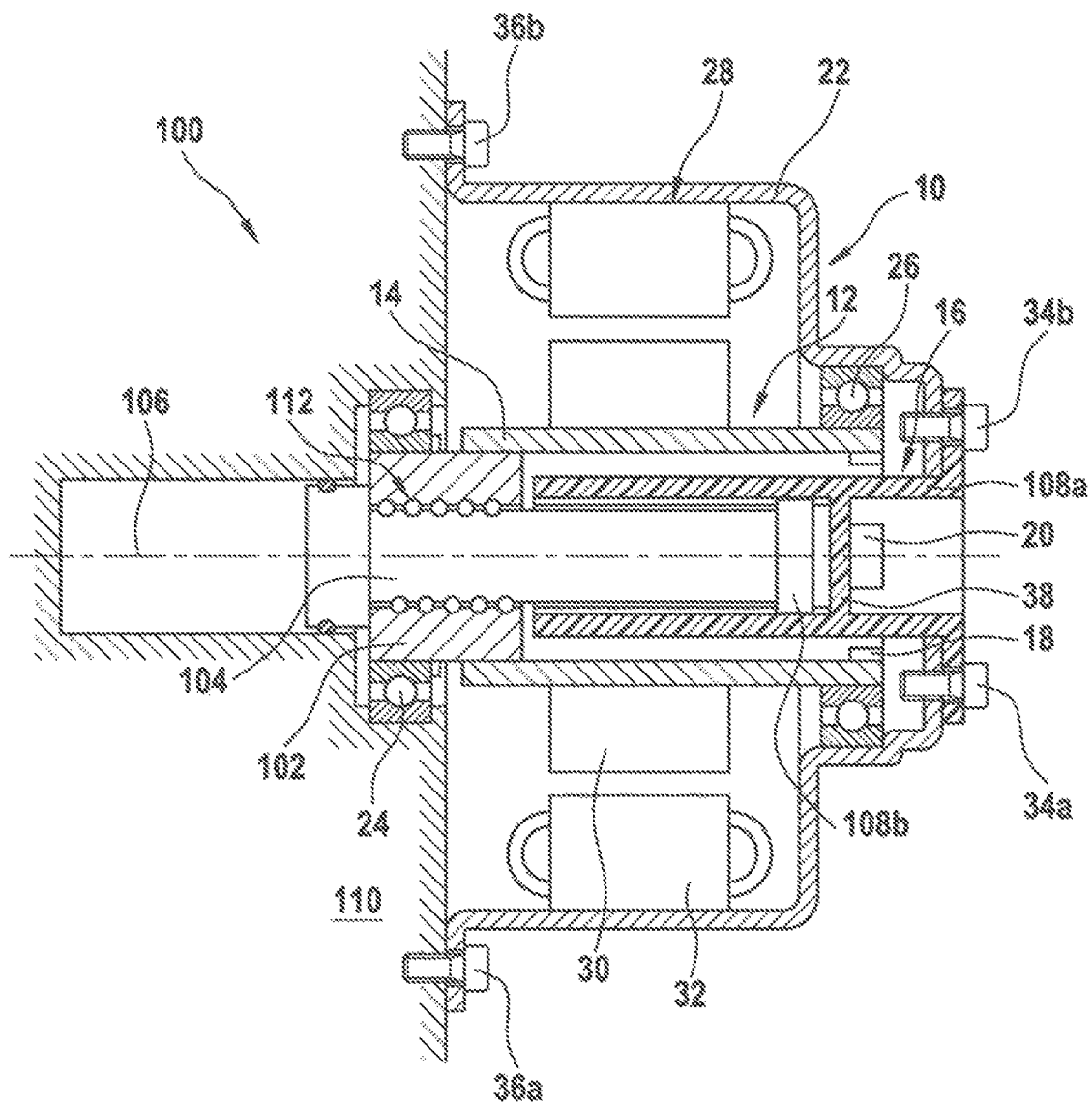

ELECTRIC HOLLOW SHAFT MOTOR

CROSS REFERENCE TO RELATED APPLICATIONS

This application is the U.S. National Phase Application of PCT International Application No. PCT/EP2018/074864, filed Sep. 14, 2018, which claims priority to German Patent Application No. 10 2017 216 664.9, filed Sep. 20, 2017, the contents of such applications being incorporated by reference herein.

FIELD OF THE INVENTION

The invention relates to an electric hollow-shaft motor having a hollow shaft which is able to be driven in rotation, and a detection device which is configured to detect the rotational position of the hollow shaft.

The invention also relates to an electromotively operated hydraulic piston having a hollow-shaft motor, a spindle which is arranged within the hollow shaft of the hollow-shaft motor, and a spindle nut which is connected to the hollow shaft of the hollow-shaft motor and which is configured to linearly displace the spindle along its longitudinal axis.

The invention furthermore relates to a brake system for a vehicle, having an electromotively operated hydraulic piston.

BACKGROUND OF THE INVENTION

In numerous application areas, the use of hollow-shaft motors gives rise to the design-related problem of it not being possible to arrange and fasten at the shaft ends a magnet for detecting the rotational position of the hollow shaft.

The prior art has disclosed for example electromotively operated hydraulic pistons in which a spindle can be displaced along its longitudinal axis by means of a hollow-shaft motor. Owing to a rotation prevention means arranged within the motor housing, it is not possible to arrange at the shaft end of the hollow-shaft motor a magnet for detecting the rotational position.

Known solutions for rotational position detection in electric hollow-shaft motors moreover generally have the disadvantage that the calibration of the angle offset is possible only after completion of the final assembly of the hollow-shaft motor, which results in a time-consuming and costly alignment procedure prior to the start-up of corresponding units.

SUMMARY OF THE INVENTION

The an aspect of the invention aims to simplify and/or improve the rotational position detection in electric hollow-shaft motors, in particular such that calibration of the angle offset is already possible during the production of the hollow-shaft motor and the expenditure in terms of time and cost for the final assembly of the hollow-shaft motor is thus reduced.

An aspect of the invention is an electric hollow-shaft motor of the type mentioned at the beginning, wherein the detection device comprises a magnet which is arranged on the hollow shaft, and a fixed magnetic field sensor which is arranged within the hollow shaft, wherein the magnetic field sensor is configured to detect a magnetic field generated by the magnet.

An aspect of the invention makes use of the realization that the space surrounded by the hollow shaft can be used for a magnetic field sensor if the magnet which generates the magnetic field to be evaluated is arranged on the hollow shaft at a suitable position. The rotation of the hollow shaft results in the magnetic field generated by the magnet likewise being set in rotation, with the result that, for the purpose of detecting the rotational position of the hollow shaft, the magnetic field of the magnet, which rotates together with the hollow shaft, can be evaluated. Precise commutation for the hollow-shaft motor can be realized via the detection of the rotational position of the hollow shaft. The assembly of the detection device, that is to say the fastening of the magnet on the hollow shaft and the arrangement of the magnetic field sensor, can already be realized during the production of the hollow-shaft motor, and so the required calibration of the angle offset can already be carried out prior to the final assembly of the electric hollow-shaft motor. The expenditure in terms of time and cost that is required for the calibration is thereby reduced considerably.

In one preferred embodiment, the hollow-shaft motor according to the invention has an evaluation device which is connected in a signal-conducting manner to the magnetic field sensor. Preferably, the evaluation device is configured to evaluate the signals of the magnetic field sensor for detecting the rotational position of the hollow shaft. Preferably, the hollow shaft able to be driven in rotation, the magnet arranged on the hollow shaft and the magnetic field sensor are arranged within a motor housing. The evaluation device may be arranged within or outside the motor housing.

In a further embodiment, the hollow-shaft motor according to the invention comprises an amagnetic, fixed fastening part on which the magnetic field sensor is arranged. For example, the fastening part is at least partially arranged within the hollow shaft and/or fastened on the motor housing. The fastening part may be fastened on the motor housing in particular by means of fastening elements, such as for example screws. The fastening part may be formed for example from plastic. Alternatively, the fastening part may also be formed from a non-ferromagnetic metal or a non-ferromagnetic metal alloy. For example, the fastening part is formed from high-grade steel. In particular, the fastening part is not formed from nickel and/or cobalt. Preferably, the fastening part forms a section of the outer side of the hollow-shaft motor. Preferably, a section, in particular an encircling section, of the fastening part is arranged in an annular gap between the magnet and the magnetic field sensor.

A hollow-shaft motor according to an aspect of the invention in which the magnet is an annular magnet, which is preferably arranged on the inner side of the hollow shaft, is also preferred. Preferably, the magnet in the form of an annular magnet is connected to the hollow shaft in a form-fitting, force-fitting and/or materially bonded manner. In particular, the magnet in the form of an annular magnet is arranged on the hollow shaft in a face-side end region of the hollow shaft. Preferably the outer diameter of the magnet in the form of an annular magnet corresponds substantially to the inner diameter of the hollow shaft.

In another preferred embodiment of the hollow-shaft motor according to an aspect of the invention, the magnet surrounds a sensing region, wherein the magnetic field sensor is arranged within the sensing region. Preferably, one section of the amagnetic, fixed fastening part extends through the sensing region. Within the sensing region surrounded by the magnet, the magnetic field generated by the magnet has a particularly high field strength, with the result that the detection of the magnetic field by the magnetic field sensor is simplified and/or can be realized with greater precision.

In a further preferred embodiment of the hollow-shaft motor according to an aspect of the invention, the magnet has diametrical magnetization. A diametrically magnetized magnet has a north pole and a south pole which is arranged opposite the north pole. If the magnet is in the form of a ring magnet, one half of the ring is formed as the north pole and the other half of the ring is formed as the south pole. In comparison with multipole magnets, the risk of a magnetization error is considerably reduced by using magnets with diametrical magnetization. In some applications, however, it may also be advantageous to use a magnet, in particular an annular magnet, with multipole magnetization.

A hollow-shaft motor according to an aspect of the invention in which a measurement surface of the magnetic field sensor is oriented so as to be substantially coplanar with the magnetic field generated by the magnet is also preferred. If the magnet is in the form of an annular magnet, it is preferable for the magnetic field sensor to be arranged at the center of the ring. Preferably, the magnetic field sensor is arranged such that the central axis of the magnet in the form of an annular magnet intersects the magnetic field sensor. The magnetic field sensor may for example be a Hall effect sensor, an AMR (anisotropic magnetoresistance) sensor, a GMR (giant magnetoresistance) sensor or a TMR (tunnel magnetoresistance) sensor.

A hollow-shaft motor according to an aspect of the invention in which one part of the hollow shaft, or an annular element connected to the hollow shaft, is formed as an outer magnetic return path for the magnet is also preferred. Preferably, the part of the hollow shaft, or the annular element connected to the hollow shaft, is formed from ferromagnetic material. As a result of the return path, the strength of the magnetic field to be detected by the magnetic field sensor is further increased in the region of the magnetic field sensor, with the result that the detection of the rotational position is simplified.

An aspect on which the invention is based is furthermore achieved by an electromotively operated hydraulic piston of the type mentioned at the beginning, wherein the hollow-shaft motor of the electromotively operated hydraulic piston is designed according to one of the previously described embodiments. With regard to the advantages and modifications of the hydraulic piston according to an aspect of the invention, first of all reference is made to the advantages and modifications of the hollow-shaft motor according to an aspect of the invention.

Preferably, the magnetic field sensor and the magnet are arranged within a plane extending orthogonally to the longitudinal axis of the spindle. Furthermore, the magnetic field sensor is preferably arranged on an extension of the longitudinal axis of the spindle. Via the detection of the magnetic field, it is again possible to determine the rotational position of the hollow shaft, this allowing precise commutation for the hollow-shaft motor. The precise commutation for the hollow-shaft motor allows the linear movement of the spindle to be controlled, as a result of which precise setting of a hydraulic pressure is made possible.

A hydraulic piston according to an aspect of the invention which has a rotation prevention means is also preferred. The rotation prevention means is configured to prevent rotation of the spindle about its longitudinal axis, wherein the magnetic field sensor is arranged on the rotation prevention means. Preferably, the rotation prevention means comprises the amagnetic, fixed fastening part. Preferably, the rotation prevention means is formed from an amagnetic material, such as for example plastic, a non-ferromagnetic metal or a non-ferromagnetic metal alloy. Preferably, the rotation prevention means extends through an annular section between the magnetic field sensor and the magnet, with the result that the magnetic field passes through the rotation prevention means.

In particular, the magnetic field sensor can be integrated into a part of the rotation prevention means. In particular, one section of the rotation prevention means is arranged between that face side of the spindle facing the magnetic field sensor and the magnetic field sensor. Preferably, the magnetic field sensor is arranged on a section of the rotation prevention means that extends substantially parallel to that face side of the spindle facing the magnetic field sensor. The rotation prevention means prevents a rotational movement of the spindle nut connected to the hollow shaft causing a rotational movement of the spindle. Owing to the rotation prevention means, a rotational movement of the spindle nut is converted into a linear movement of the spindle. The rotation prevention means is preferably in the form of a form-fitting rotation prevention means.

Preferably, the hollow shaft and the spindle nut are connected to one another in a torsionally rigid manner but so as to be axially movable in relation to one another. The axial mobility of the hollow shaft and the spindle nut allows the use of two fixed bearings for support of the rotor unit, which comprises the hollow shaft and the spindle nut, with respect to the motor housing. Preferably, a first fixed bearing is arranged on the spindle nut, and a second fixed bearing is arranged on the hollow shaft. The point of coupling between the hollow shaft and the spindle nut is preferably configured to be released in a reversible and non-destructive manner. The spindle can thus be detached from the hollow-shaft motor, for example in order, during production, to be able to carry out test routines and/or to be able to carry out rework tasks.

Preferably, multiple balls are arranged between the spindle nut and the spindle, with the result that the spindle nut, the spindle and the balls form a ball screw. This leads to reduced friction and to reduced wear of the connection between the spindle nut and the spindle, with the result that the service life of the hydraulic piston is increased and the risk of failure is reduced.

The hollow-shaft motor according to an aspect of the invention may furthermore also be used as a canned motor, for example for driving a pump.

An aspect on which the invention is based is furthermore achieved by a brake system of the type mentioned at the beginning, wherein the hydraulic piston of the brake system is designed according to one of the previously described embodiments. With regard to the advantages and modifications of the brake system according to an aspect of the invention, reference is made to the advantages and modifications of the hollow-shaft motor according to an aspect of the invention and to the advantages and modifications of the hydraulic piston according an aspect of to the invention.

In particular, the hydraulic piston is configured to provide one or more hydraulic wheel brake units with a suitable hydraulic pressure for execution of a braking process. It is furthermore preferable that the hollow-shaft motor is connected to an evaluation device of a brake cylinder, wherein the brake cylinder is coupled to a brake pedal and the evaluation device derives information on the braking requirement of a driver on the basis of the state of the brake cylinder. Said information is then used for the control of the hollow-shaft motor and thus also for the actuation of one or more wheel brake units.

BRIEF DESCRIPTION OF THE DRAWINGS

A preferred embodiment of the invention will be discussed and described in more detail below with reference to the appended drawing. In the drawing:

The FIGURE shows, in a schematic illustration, an exemplary embodiment of the electromotively operated hydraulic piston according to the invention.

DETAILED DESCRIPTION OF THE PREFERRED EMBODIMENTS

The FIGURE shows an electromotively operated hydraulic piston 100, which has a hollow-shaft motor 10, has a spindle nut 102, has a spindle 104 and has a rotation prevention means 108a, 108b.

The electric hollow-shaft motor 10 comprises a hollow shaft 14 which is able to be driven in rotation and which is formed from a ferromagnetic material, and a detection device 16 which is configured to detect the rotational position of the hollow shaft 14. The detection device 16 has a magnet 18 which is arranged on the hollow shaft 14, and a fixed magnetic field sensor 20 which is arranged within the hollow shaft 14.

The magnet 18 is an annular magnet and has diametrical magnetization. Moreover, the magnet 18 is arranged on an inner side of the hollow shaft 14 and surrounds a sensing region, wherein the magnetic field sensor 20 is arranged within the sensing region. One part of the hollow shaft 14 is formed as an outer magnetic return path for the magnet 18.

The magnetic field sensor 20 and the magnet 18 are arranged within a plane extending orthogonally to the longitudinal axis 106 of the spindle 104, wherein the magnetic field sensor 20 is furthermore arranged on an extension of the longitudinal axis 106 of the spindle 104. A measurement surface of the magnetic field sensor 20 is oriented so as to be substantially coplanar with the magnetic field generated by the magnet 18, wherein the magnetic field sensor 20 is configured to detect a magnetic field generated by the magnet 18.

The detection device 16 furthermore has an evaluation device which is configured to evaluate the signals of the magnetic field sensor 20 for the purpose of determining the rotational position of the hollow shaft 14.

The spindle 104 is arranged within the hollow shaft 14 of the hollow-shaft motor 10. The spindle nut 102 is connected to the hollow shaft 14 in a torsionally rigid and axially movable manner. Owing to the axial mobility, the spindle nut 102 and the hollow shaft 14 are able to be supported by means of respective fixed bearings 24, 26. Multiple balls 112 are arranged between the spindle nut 102 and the spindle 104, with the result that the spindle nut 102, the spindle 104 and the balls 112 form a ball screw.

The spindle nut 102 and the hollow shaft 14 together form a rotor unit 12. The connection between the spindle nut 102 and the hollow shaft is reversibly and non-destructively releasable. The spindle 104 is displaced linearly along its longitudinal axis 106 by rotation of the spindle nut 102.

A coil 30 is arranged on the hollow shaft 14 and interacts with the coil 32 of the stator 28 of the hollow-shaft motor 10 so as to drive the hollow shaft 14 in rotation.

The rotation prevention means 108a, 108b is configured to prevent rotation of the spindle 104 about its longitudinal axis 106. The magnetic field sensor 20 is arranged on an amagnetic, fixed fastening part 38 which is formed from plastic, wherein the fastening part 38 is arranged within the hollow shaft 14 and is a constituent part of the rotation prevention means 108a, 108b.

The rotation prevention means 108a, 108b, is of two-part form, wherein a first, fixed part 108a extends sectionally along the spindle 104 and through an annular gap between the magnet 18 and the magnetic field sensor 20. A second part 108b is arranged on the spindle 104, and is linearly movable together with the spindle 104.

That part of the rotation prevention means 108a on which the magnetic field sensor 20 is fastened is connected to the motor housing 22 by means of fastening elements 34a, 34b. The fastening elements 34a, 34b are in the form of screws. A hydraulic unit 110 is furthermore arranged on the motor housing 22. The hydraulic unit 110 is fastened on the motor housing 22 by means of fastening elements 36a, 36b in the form of screws and is configured to provide one or more wheel brake units with a suitable hydraulic pressure for execution of a braking process.

LIST OF REFERENCE SIGNS

10 Hollow-shaft motor
12 Rotor unit
14 Hollow shaft
16 Detection device
18 Magnet
20 Magnetic field sensor
22 Motor housing
24 Bearing
26 Bearing
28 Stator
30 Coil
32 Coil
34a, 34b Fastening elements
36a, 36b Fastening elements
38 Fastening part
100 Hydraulic piston
102 Spindle nut
104 Spindle
106 Longitudinal axis
108a, 108b Rotation prevention means
110 Hydraulic unit
112 Balls

The invention claimed is:

1. An electromotively operated hydraulic piston comprising:
   an electric hollow-shaft motor comprising:
      a first hollow shaft which is able to be driven in rotation;
      a fixed second shaft having two hollow portions and at least partially disposed within the first hollow shaft, the second shaft forming a rotation preventor; and
      a detection device configured to detect a rotational position of the first hollow shaft, wherein the detection device comprises:
         a magnet disposed on an inner portion of the first hollow shaft and adjacent the second shaft, and
         a fixed magnetic field sensor which is arranged on a wall of a first hollow portion of the second shaft, wherein the magnetic field sensor is configured to detect a magnetic field generated by the magnet;
   a spindle which is arranged within a second hollow portion of the second shaft of the hollow-shaft motor; and a spindle nut which is connected to the first hollow shaft of the hollow-shaft motor and which is configured to linearly displace the spindle along a longitudinal axis; and wherein the rotation preventor is configured to prevent rotation of the spindle about the longitudinal axis.

2. The hydraulic piston as claimed in claim 1, wherein the magnet has diametrical magnetization.

3. The hydraulic piston as claimed in claim 1, wherein a measurement surface of the magnetic field sensor is oriented so as to be substantially coplanar with at least a portion of the magnetic field generated by the magnet.

4. The hydraulic piston as claimed in claim 1, wherein one part of the first hollow shaft, or an annular element connected to the first hollow shaft, is formed as an outer magnetic return path for the magnet.

5. A brake system for a vehicle, comprising:
an electromotively operated hydraulic piston;
wherein the hydraulic piston is designed as claimed in claim 1.

6. The hydraulic piston as claimed in claim 1, wherein the first hollow portion and the second hollow portion of the second shaft are linearly adjacent one another.

7. The hydraulic piston as claimed in claim 1, wherein at least a portion of the spindle moves linearly within the second hollow portion of the second shaft.

8. The hydraulic piston as claimed in claim 1, wherein at least the wall of the second shaft comprises an amagnetic, fixed fastening part on which the magnetic field sensor is arranged.

9. The hydraulic piston as claimed in claim 8, wherein the further magnet is an annular magnet.

10. The hydraulic piston as claimed in claim 1, wherein the magnet is an annular magnet.

11. The hydraulic piston as claimed in claim 10, wherein the magnet surrounds a sensing region, and wherein the magnetic field sensor is arranged within the sensing region.

* * * * *